United States Patent [19]

Goldkuhle

[11] Patent Number: 4,672,681
[45] Date of Patent: Jun. 9, 1987

[54] MAIL IMAGING METHOD AND APPARATUS

[75] Inventor: Gerhard Goldkuhle, Konstanz, Fed. Rep. of Germany

[73] Assignee: Licentia Patent-Verwaltungs GmbH, Fed. Rep. of Germany

[21] Appl. No.: 797,817

[22] Filed: Nov. 14, 1985

[30] Foreign Application Priority Data

Aug. 2, 1985 [DE] Fed. Rep. of Germany ....... 3527725

[51] Int. Cl.[4] .............................................. G06K 9/42
[52] U.S. Cl. ..................................... 382/47; 340/731; 382/1
[58] Field of Search ...................... 382/1, 47; 340/731; 209/584, 940; 358/287, 288

[56] References Cited

U.S. PATENT DOCUMENTS

| 3,670,099 | 6/1972 | Oliver | 358/288 |
| 4,013,999 | 3/1977 | Erwin et al. | 382/1 |
| 4,168,489 | 9/1979 | Ervin | 340/731 |
| 4,447,882 | 5/1984 | Walz | 382/47 |
| 4,573,200 | 2/1986 | Bednar et al. | 382/47 |

Primary Examiner—Leo H. Boudreau
Attorney, Agent, or Firm—McGlew and Tuttle

[57] ABSTRACT

A method and apparatus for the automatic adaptation of mailing formats of different sizes to be scanned opto-electrically, to a given image reproduction format, is used in particular for scanning the address fields of letters and the like. An image content reduction is carried out in such a way that in the scanning of the mailing in dependence on the height and/or length excess of the mailings from given standard values $H_o$, $L_o$, a corresponding number of image points within each image scan element are omitted according to a given rule and the image reproduction is generated by non-omitted image points of the image scan elements. In order that lettering edge sharpness will remain equally sharp, the image point magnification between image point scan size and image point reproduction size is maintained constant. In particular with a columnwise scanning, the rule for the omitting of image points is chosen so that at least within the mailing portion bearing the information, the omitting of image points in the scan direction and perpendicular thereto, occurs periodically.

21 Claims, 9 Drawing Figures

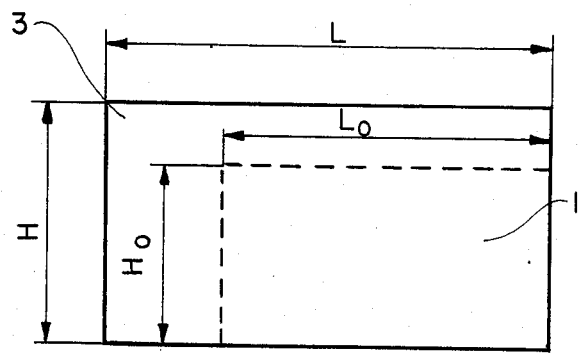
FIG. 1A
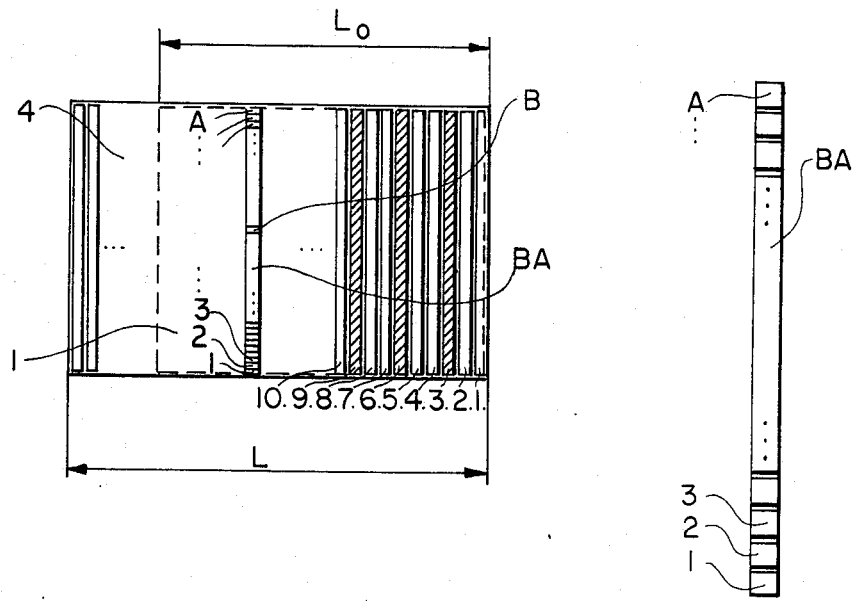
FIG. 1B
FIG. 1C

MAIL IMAGING METHOD AND APPARATUS

FIELD AND BACKGROUND OF THE INVENTION

The present invention relates in general to opto-electronic scanning techniques for mail, and in particular to a new and useful method and apparatus for automatically adapting mailing formats in different sizes to be scanned opto-electronically, to a given image reproduction format.

A known method for adapting different mailing formats to a given image reproduction format uses the combining of several scanned image points. The disadvantage of such a method is that the lettering or type edges become blurred in the reproduced image, since image resolution is reduced by the merging of several image points. That is, the reproduction image quality decreases. Additionally, an expensive electronic image treatment is necessary for the merging of several image points to a "black" or "white" image point. Furthermore, in this case, very often an incorrectly interpreted image detail may occur, as the merged image point is selected dependent on the occurring number of black and white image points and on the logic "black" or "white" taken as a basis.

SUMMARY OF THE INVENTION

It is an object of the invention to provide a method for the automatic adaptation of mailing formats of different sizes to be scanned opto-electronically, to a given image reproduction format. Another object of the invention is to provide an apparatus for practicing the method which substantially reduces the image memory needed, simplifies the electronic image processing from imaage scanning to generation of the reproduction image, and accelerates it while at the same time maintaining a high lettering or type edge sharpness and with as small as possible a concentration of the data content of the reproduction area.

Accordingly, another object of the invention is to provide a method for automatically adapting mailing formats of different sizes, to a selected image reproduction format having a selected length and selected height, comprising omitting individual points or entire image scan elements containing a plurality of points, on a periodic basis along the length and/or height of the mailing format, according to a rule or algorithm and depending on whether the mailing format exceeds the selected height and/or the selected length of the reproduction format. A reproduction image is formed using non-omitted image points and image elements without reducing the size of the non-omitted image points and image elements.

A further object of the invention is to provide an apparatus for practicing such a method.

A still further object of the invention is to provide an apparatus for the automatic adaptation of various mailing format sizes to a standard reproduction format which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1A is a schematic illustration comparing a standard reproduction format to a mailing format of larger size;

FIG. 1B is a schematic illustration showing how columns are eliminated from a columnwise scanning of a long envelope having a standard format height;

FIG. 1C is an enlarged view of the single image scanning element having plural image points;

DESCRIPTION OF THE PREFERRED EMBODIMENTS

Figure 1D:
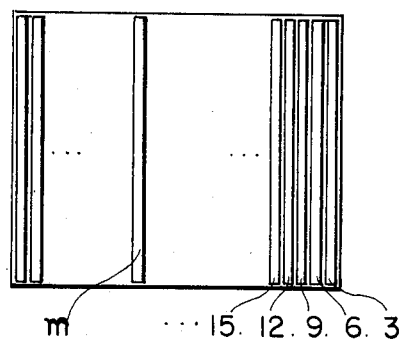
FIG.1D is a schematic illustration showing image content for a reproduction image which is compressed to a standard format by eliminating certain image columns.

In automated letter or mail distribution systems, in particular in automatic address readers or video coding systems, the addressed sides of letters or mailings are scanned, point by point, with the aid of camera tubes or photodiode lines, and the individual point brightnesses are evaluated and transformed into digital signals. It is possible through analog/digital conversion to correlate digital halftone weights to the brightness values of the individual image points. In the simplest case, merely the decision "black" or "white" is made by a threshold switch. In this manner the information content of the addresses, usually written in a dark color, is lifted off the lighter paper and made accessible for data processing.

Generally the scanning of address fields is done linewise or columnwise, with a higher number of image points per line (or column) meaning better image resolution. Similarly also the image resolution in terms of the optical information increases with the line or column density. A higher image resolution in the scanning process makes a better reproduction quality possible, e.g. on viewing screens or with more sophisticated identification techniques. This remains so according to the invention, even if in the course of image processing, the number of image points per unit area are reduced.

Automatic adaptation of mailing formats to a given image reproduction format is desired to reduce the amount of image memory needed and to accelerate electronic image treatment and data transfer. Such measures are especially worth while when many large address fields must be scanned, treated, and simultaneously stored.

The method of the invention permits reduction of the number of scanned image points to a volume which is suitable for further processing and reproduction, while maintaining the image point enlargement between scanning and reproduction size and effecting all this at low cost.

When there are different size scanning fields for the mailing formats, such as letters with different format, automatic size adaptation of the letter to be scanned, to the given image reproduction format, is necessary. This adaptation takes place preferably with the method according to the invention.

In FIG. 1A, a desired scanning image format 1 for display means (for example on a monitor 2 in FIG. 2A) is represented. The letters or postcards which have this format are reproduced without employing the method of the invention and with a standard image point number $B_0$ on the monitor 2, i.e. each scanned image point B is reproduced on the monitor 2 in given form. The standard format is chosen at least as small as the smallest occurring mailing format. Advantageously a standard format of selected height $H_0$ and selected length $L_0$, for example of postcard size, is taken as a basis.

Now if the format of a letter 3 to be scanned is larger than the standard format ($H_0, L_0$), first the deviation of the actual height H and of the actual length L of the letter 3 from the standard height $H_0$ and length $L_0$, is determined(H and L respectively).

Then the image content of letter 3 to be scanned, which in height and length has a larger image field scanning area than the standard format 1, is reduced to the standard number of image points $B_0$ by omission of certain image points B.

In the simplest case which is shown in FIG. 1B, if only the length L of the letter 4 differs from the standard format 1, preferably a columnwise scanning should be chosen. One column, consisting of an image scan element BA, has a number A (1, 2, 3, ... to A) of image points B, for the standard format, for example 600, see FIG. 1B and 1C. The number A is given for a desired image resolution. FIG. 1C shows an image scan element BA with A image points, on an enlarged scale.

In such a scan, preferably complete image scan elements 8A consisting of one column should be omitted.

If the relative deviation ($\Delta L/L$) of the standard length $L_0$ from the mailing length L is representable in the form of a branch fraction:

$$\Delta L/L = p/m \text{ (where p, m are integers, } p \neq 1 \text{ and } \Delta L = L - L_0) \qquad (1)$$

preferably p columns are to be omitted within m successive scanned columns. This can be done for example by periodically omitting one column of p successive columns and one column of (m−p) subsequent columns during the scanning process or cycle.

Figure 3:
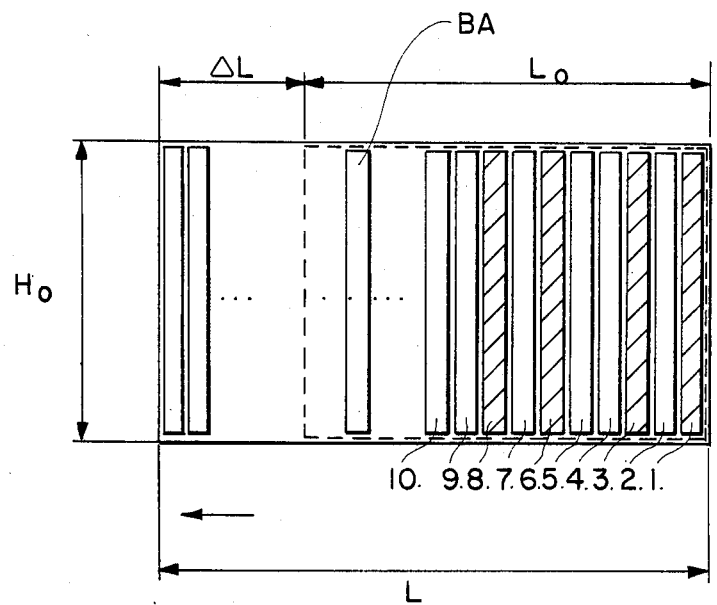
FIG. 3 is a schematic illustration showing how image scan elements or columns can be eliminated which are spaced by different amounts across the entire format.

Preferably the first column of p successive columns and the first column of (m−p) subsequent columns is periodically omitted during the scanning process. In FIG. 3, for this case the omitted columns, i.e. image scan elements, are shown hatched. The standard length $L_0$ is for example 120 mm and the letter length L=200 mm. Hence p=2 and m=5. The generation of the reproduction image (reduced image) is then realized using the unhatched image scan elements of FIG. 3, by compressing them and stringing them together. In other words, 2 out of every 5 columns are omitted.

If the standard length $L_0$ is for example 150 mm and the length L of the given scanning area (letter length) is 225 mm, there results from equation (1) m=3 and p=1; i.e. in this particular case (deviations representable in the form of a parent fraction) preferably all image points of each $m^{th}$ column (in the example every third column, or the 3rd, 6th, 9th, 12th column, etc.) are omitted (these columns are hatched in FIG. 1B). The image content of the reproduction image is thus composed of the non-omitted columns (lst, 2nd, 4th, 5th, 7th, 8th, 10th column etc., as shown in FIG. 1B).

In FIG. 1D, the compressed image content of the reproduction image to the standard format $H_0$, $L_0$ is represented schematically. These individual image points are then reproduced for example on a monitor in given enlarged form.

Figure 1E:
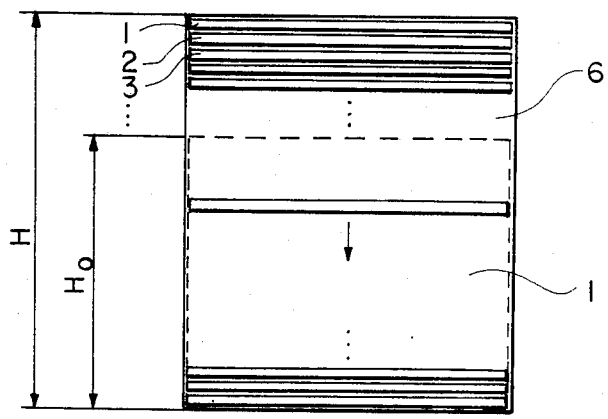
FIG. 1E is a view similar to FIG. ID showing image compression using linewise scanning.

In case only the height of the letter 6 differs from the standard format 1, linewise scanning (see FIG. 1E) should preferably be selected. The image content reduction can then occur by line omission, for example according to the same rule analogously as in the preceding columnwise scanning:

$$\Delta H/H = q/r \text{ (where } \Delta H = H - H_0) \qquad (2)$$

$H_0$ standard height. H is the height of the letter to be scanned. Here preferably a number of q lines (given by the ratio $\Delta H/H$) within r successive lines is omitted during the scanning process. The omitting of specific lines may occur preferably in analogy to the previously mentioned columnwise scanning.

Figure 1F:
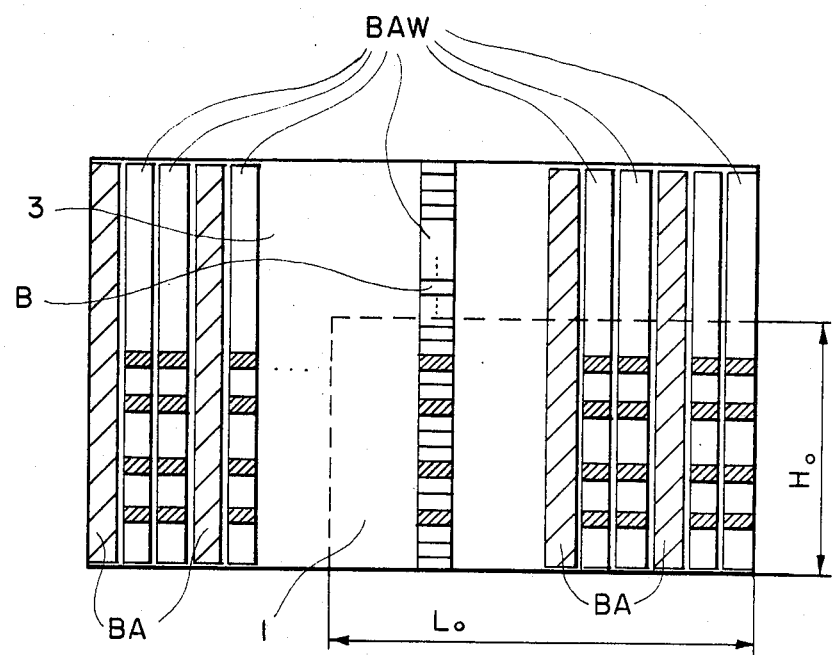
FIG. 1F is an enlarged schematic view showing how individual image points as well as image scan elements containing a plurality of points can be omitted for reducing an image.

For the general case (letter length L greater than standard length $L_0$ and letter height H greater than standard height $H_0$) however, a combined reduction of image points (line and column reduction) is necessary (FIG. 1A and 1F). For this, too, a columnwise scan is to be preferred, especially when a letter 3 which is standing on its longitudinal edge, whose longitudinal extent is arranged perpendicular to the transport direction R of the mailings (see FIG. 2A) as well as to the occurring surface normal of the letters, is scanned by means of a photodiode line 26.

The number A of image points B of an image scan element BA, that is, the number of diodes D, is to be chosen as a function of the image resolution.

The omission of image points occurs in a twofold manner (see FIG. 1F):

(1) If the letter 3 is longer than the standard length $L_0$, preferably all image points of the column given by rule or equation (1) are omitted. One column here corresponds to one image scan element BA;

(2) If the letter 3 is also greater in height H than the standard height $H_0$, then additionally a part of the image points B of all other (not yet omitted) columns BAW is omitted.

This is done for example by periodically omitting q image points from a column BAW.

If the relative deviation $\Delta H/H$ of the standard height $H_0$ from the mailing height H is representable in the form of a branch fraction:

$$\Delta H/H = q/r \qquad (3)$$

according to equation (2) at least by approximation, then within each image scan element BAW (column) not to be omitted there are to be omitted additional image points of these image scan elements BAW; e.g. in a preferred manner in such a way that periodically within the image scan elements the first image point B of q successive image points and the first image point of (r−q) subsequent image points is omitted.

If the ratio can be expressed in the form of a parent fraction (q=1), then within each image scan element the $r^{th}$ image point is omitted in a way which is analogous to equation (1).

This "reduced" column then corresponds to a reduced scan element BAW (see FIG. 1F). In the adaptation of a letter format of length L=225 mm and height H=140 mm to the standard image point number $B_o$ with the format $H_o=100$ mm and $L_o=150$ mm, this means for example that (a) from equation (1) (with p=1): Every third column (BA) (all image points of every third column) is omitted in the scan; every successive third column contributes nothing to the image reproduction content (hatched columns in FIG. 1F);

(b) from equation (3): within each scanned column which is not omitted, out of seven image points two image points are omitted (e.g. the image points 4, 7, 11, 14, 18, 21, etc. see FIG. 1F, which are there shown hatched). It is evident therefrom that in alternating sequence the image point spacing of omitted image points is three image points and four image points. The individual points to be omitted of the columns not to be omitted are distributed over the scanned letter format "in line fashion". The omitting of image points in the column scan, caused by the height deviation of the letter format to be scanned from the standard height $H_o$, corresponds to the omitting of lines in the line scan.

In FIG. 1F the image points of a scan element BA which are omitted are shown hatched, those which represent the content of the image reproduction of a scan element are not hatched.

A linewise scan may be suitable when the letters to be scanned are transported for example on their short longitudinal edge.

If the letter address field to be read is substantially smaller than the letter format, preferably the spacing of the columns, lines, image points of a column and/or line to be omitted should preferably be chosen as a function of the data density. This can be obtained in a simple manner from the image scan information, so that in given areas (for example 100–1000 columns or lines) in which there is no address-specific information (that is, the image points furnish point brightnesses which lie below a given "noise threshold" and therefore are rated "white") preferably a much smaller spacing of the columns, lines or image points to be omitted of a column or line is selected.

Generally the weighting of the number to be omitted of columns or lines can be made dependent on the data density occurring in the surrounding of the column or line.

With such a nonlinear distribution of the omitted columns and/or lines, the spacing of the columns, and/or lines, in less significant areas (outside the address field) of the letter format is smaller than in the more important areas (address field of the letter). This results in different image qualities and distortion over the letter length and/or height, but which can be accepted.

Figure 2A:
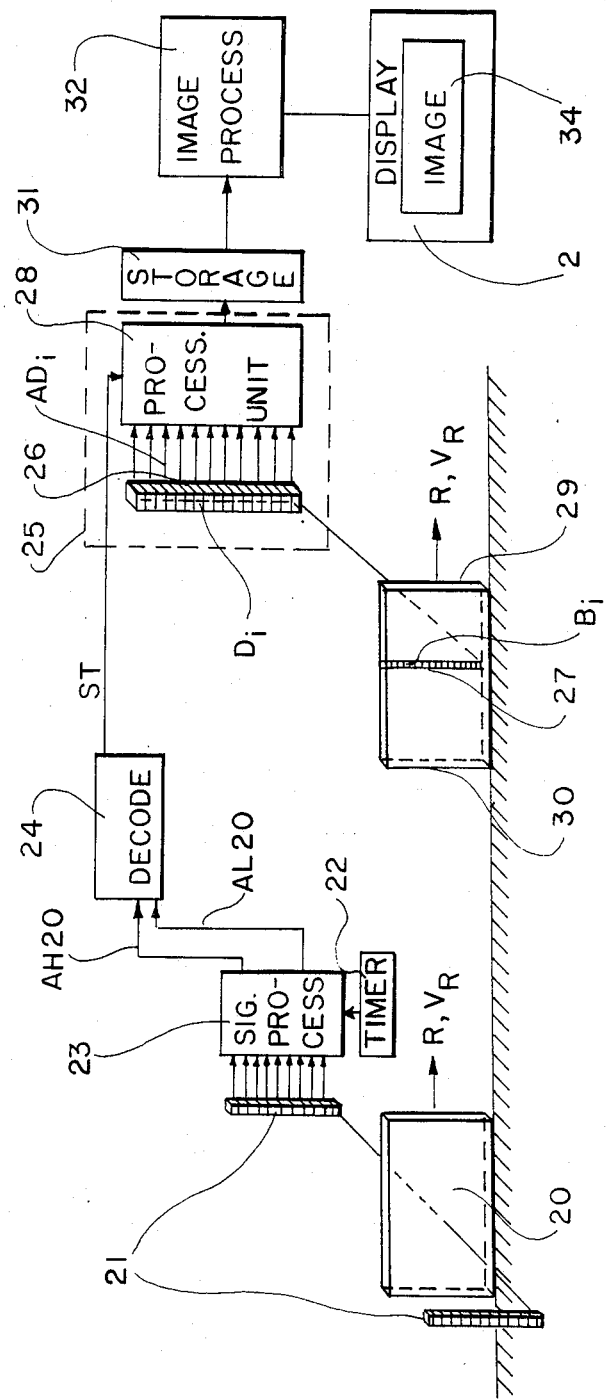
FIG. 2A is a block diagram showing an apparatus for practicing the inventive method.

FIG. 2A shows schematically a preferred embodiment of a columnwise scan of mailings, for example letters, provided with address fields, inside an address reader.

A letter 20 resting on its longitudinal edge is conveyed for example by means of conveyor belts into an automatic address reader in transport direction R at a constant speed $V_R$. According to FIG. 2A, the format sizes $H_{20}$, $L_{20}$ of the incoming letter are determined by means of a sensor arrangement 21. This may be for example a light barrier which is arranged perpendicular to the transport direction R of letter 20 in line form. From the number of light barrier elements switched dark as well as from the passage time of the letter, the height H of the letter and by means of a timer 22 the length $L_{20}$ of the letter 20 can be determined. Preferably, signal processing means 23 picks up the sensor reception signals and furnishes two output signals AL20, AH20; one is proportional to the length excess $\Delta L$ of the letter relative to the standard $L_o$, the other corresponds to the height excess $\Delta H$ of the letter relative to the standard $H_o$. These signals are further processed following decoding means 24.

After passing through the sensor arrangement 21, the letter moves into the area of a scanning device 25.

Figure 2B:
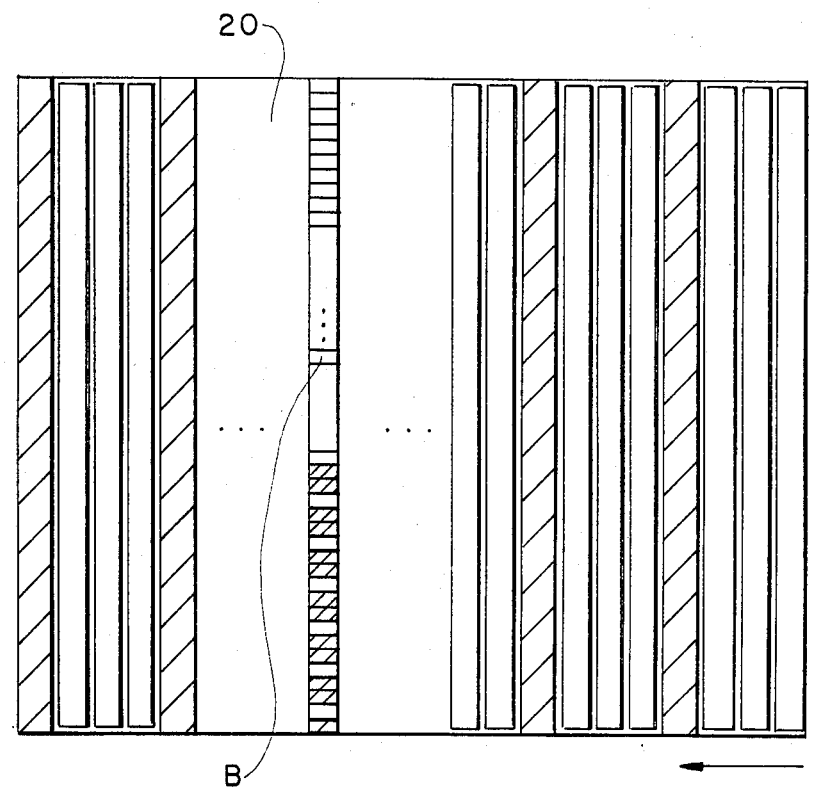
FIG 2B is a schematic illustration showing the omission of image points and image scan elements containing plural points for generating a reproduction image.

There the letter is scanned preferably by means of a photodiode line 26 in columnwise fashion. In accordance with the brightness distribution within a slit 27 (corresponding preferably to one image scan element), the individual diodes Di of line 26 receive different light intensities. If a better image resolution, i.e. a higher image point number per column, is demanded, a correspondingly higher number of diodes per column with the respective optical system is needed. To be able to scan letters of a maximum height H of 150 mm and a length of 250 mm, for example, with sufficient image resolution, a photodiode line 26 with about 1000 diodes and with an observable slit width of about 0.1 mm must be used. FIGS. 2A and 2B show schematically an image scan slit or element area 27 (hatched) of a width of 0.1 mm for example on a letter of the height H=150 mm. The height of the image point Bi of an image scan element or element area 27 is for example 0.1mm.

There may be correlated to the brightness values of the individual image points Bi for example via analog/-digital, conversion digital halftone weightings. In the simplest case merely the decision "black" or "white" is made by a threshold switch. Preferably the brightness values of the mailing or letter 20 picked up by the diodes Di of the photodiode line 26 are supplied continuously to a processing unit 28. This can be done for example by scanning the letter 20 uninterruptedly with the given image scan element area 27 having slit width for example of 0.1 mm and height of 150 mm, from its front edge 29 to its rear edge 30 during its transport in an opposite transport direction. This can take place digitally by timing the input of the scanning moments as well as continuously.

The diode output signals ADi corresponding to the brightness values "black" or "white" are preferably amplified in processing unit 28.

Now if the format of the letter 20 to be scanned is larger than the given standard format 1, a reduction of the image content of this letter is necessary. In order that the lettering or type edges remain equally sharp in the reproduction image, all image points to be reproduced of the surface of the letter or else for example only a part thereof (address field) are advantageously reproduced with constant given image point magnification.

The reduction of the image content occurs preferably so that a part of the brightness values of the letter surface picked up and evaluated by the individual diodes Di of the image scan element 27 are omitted in the reproduction. This takes place in each individual scanning process or cycle.

The control of the omission of image points Bi is carried out preferably by means of decoding means 24, which furnishes control signals ST to the processing unit 28 for the suppression of the image point scan signals generated by diodes Di which are to be omitted.

Whenever the image points Bi picked up by the individual diodes Di which are to contribute to the image content reduction occur during the scanning, the decoding means 24 will furnish a control signal ST, in such a way that the processing unit 28 suppresses this image point scan signal and therefore this image point value is not delivered to the following storage unit 31. If the letter length $L_{20}$ is greater than the standard length $_o$, during columnwise scanning, complete image scan elements or element areas are omitted. If only the letter height H is greater than the standard height $H_o$, then preferably during columnwise scanning, individual image points Bi of the image scan elements 27 are omitted, it being possible to select the spacing of the omitted image points according to different criteria:

1. If the address portion is of a similar size as the letter format itself, preferably one according to the rules given by the equations (1), (2) and (3) for the omission of image points or image scan elements should be selected.

From the determination of the relative deviation of the given standard format $H_o$, $L_o$ from the actual letter format H, L to be scanned, there can be determined according to rule (3) and according to rule (1) the image points q to be omitted of column or respectively the columns p to be omitted (that is, the entire image scan element in columnwise scanning). If for example the letter height is 300 mm, the standard height 100 mm, the letter length 200 mm, the standard length 150 mm, there results from equations (3) and (1):

$$q/r = \tfrac{2}{3} \qquad \text{equation (3)}$$

$$p/m = \tfrac{1}{3}(p-1!) \qquad \text{equation (1)}$$

This means that:

(1) every 4th scanned column contributes nothing to the image content of the reproduction image, hence is omitted. That is, the decoding means 24 delivers to the processing unit 28 in digitial scanning a control signal ST which suppresses all output signals ADi of the photodiode line 26 open every 4th scanning or in the continuous case all output signals ADi after each line interval $\Delta t$ is suppressed for a period depending on the transport speed $V_R$letter and given width $\Delta s$ of the image scan element 27.

$\Delta t$ derives from the condition:
$\Delta t = \Delta t = \_ \nu/R\ s,r$ (2) of these successive image points within an image scan element, two image points are omitted, for example the first and the last image point or else the first two image points. Within the occurring image scan elements during the scanning of the letter the method must not be changed. The omitting of image points in the image scan elements must occur linewise.

In FIG. 2B, the omitted image points and omitted image scan elements of several schematically represented image scan elements 27 are marked by hatching for this specific case. The generation of the reproduction image (reduced image) is realized by the non-hatched image points or respectively image scan elements by stringing together (compression).

2. If the address portion is very small as compared with the letter format, a larger number of successive image scan elements, are preferably to be omitted where the address field does not exist. A suitable rule for this is that upon occurrence of a given number of successive columns (or lines) provided with no image information, for example 90% of these scanned are omitted and only the remaining 10% are used the generation of the reproduction image.

In the area of the address portion of the letter there can then be effected preferably a linear image content reduction (as described above).

In the area of the address portion of the letter there can then be effected preferably a linear image content reduction (as described above).

Now in order that the processing unit 28 will not store the respective brightness values of the image points or columns (or line scanning) into the storage unit 31, but will suppress them and store in the storage unit 31 only the non-omitted image point values, the decoding means 24 should preferably be laid out for example so that every time during the individual scanning processes the decoding means 24 furnishes a so-called "erasing pulse", which temporarily erases the image point value and/or the entire column not to be stored by the processing unit 28.

The triggering of corresponding "erasing pulses" of the decoding means 24 is derived from the output signals of the signal processing means 23, which are proportional to the length and/or height excess $\Delta L$, $\Delta H$ with respect to the given standard format. Via image processing means 32, which receives the data of memory 31 and transforms them for example into compatible video signals, the reduced image content of letter 20 is supplied to image display means 2, for example a video coding system, a monitor or the like.

There the reading of the reproduction image 34 generated from the reduced image content (for example the rapid pickup of the zip code for a video coding power of 1 to 1.5 letters per second) is very convenient ("pleasant"), as with this reduction method a shrinkage of the address field causes no unpleasant densification of the information offered per reproduction area. Due to the small total number of image points per reproduction image, a sufficiently high frame repetition frequency can be achieved, which ensures a sufficiently high flickerlessness.

The described method and arrangement permit image processing with a two-level evaluation of the image point brightnesses, as assumed in the inventive embodiment, as well as with several halftone evaluations.

To improve lettering or type edge smoothing, the mode or representation of a non-omitted image points may optionally be modified so that adjacent image points are "filled out", that is, transformed to the image brightness "black".

While specific embodiments of the invention have been shown and described in detail to illustrate the application of the principles of the invention, it will be understood that the invention may be embodied otherwise without departing from such principles.

What is claimed is:

1. A method for the automatic adaptation of mailing formats having different sizes, to a selected image reproduction format having a selected height and a selected length, comprising:

opto-electronically scanning a mailing format which has at least one of a height excess and a length excess over the selected height and length respectively, the scanning being executed in a scanning direction using an image scan element having a plurality of image points distributed transversely to the scanning direction;

omitting certain image points of the image scan element during scanning as a function of the at least one of the height excess and length excess of the mailing format, to leave nonomitted image points;

generating a reproduction image having reproduction image points and using the non-omitted image points of the image scan element; and maintaining a constant size relationship between the image points of the image scan element and the image points of the reproduction image regardless of the number of image points of the image scan element which are omitted.

2. A method according to claim 1, wherein the image scan element is one of a column scan element for scanning in length direction and a line scan element for scanning in the height direction, a number of image points for the image scan element being selected for a selected image resolution for the reproduction image.

3. A method according to claim 2, wherein the mailing format has a length (L) which exceeds the selected length ($L_o$) by a length excess amount ($\Delta L$), the scanning direction being parallel to the length of the format and the image scan element comprising a column scan element, the method including periodically omitting p columns within each m successive columns during the scanning wherein p and m are integers with $p \neq 1$, and wherein:

$$\Delta L/L = p/m.$$

4. method according to claim 3, including periodically omitting one column of p successive columns and one column of (m−p) subsequent columns during the scanning.

5. A method according to claim 4, including periodically omitting the first of p successive columns in the first of (m−p) subsequent columns during the scanning.

6. A method according to claim 3, wherein when a relative deviation ($\Delta L/L$) of the selected length($L_o$) from the mailing format length (L) is approximately representable in the form of a parent fraction $\Delta L/L = 1/m$, the method including periodically omitting every $m_y$h column.

7. A method according to claim 2, wherein the mailing format has a height (H) which is greater than the selected height ($H_o$) by a height excess ($\Delta H$), including scanning the mailing format by a line and periodically omitting q lines for every r successive lines during the scanning wherein:

$$\Delta H/H = q/r.$$

8. A method according to claim 7, including periodically omitting one line of q successive lines and one line of (rq 31 q) successive lines.

9. A method according to claim 8, including periodically omitting a first of q successive lines and a first of (r−q) successive lines during the scanning.

10. A method according to claim 3, wherein the mailing format has a height (H) which is greater than the selected height ($H_o$) by a height excess amount ($\Delta H$), the method including omitting every $r^{th}$ line during the scanning wherein:

$$\Delta H/H = 1/r.$$

11. A method according to claim 2, including using a columnwise scanning of the mailing format, the image scan element comprising a column scan element, the mailing format having at least one of a length (L) and a height (H) which is greater than the selected length ($L_o$) and height ($H_o$) respectively, the method including periodically omitting p columns out of m successive columns when a relative deviation ($\Delta L/L$ with $\Delta L = L - L_o$) of the selected length from the mailing length is represented at least approximately in the form of a branch fraction $$\Delta L/L = p/m$$

where p and m are integers and $p \neq 1$; and periodically omitting q image points of r successive image points when the relative deviation ($\Delta H/H$, with $\Delta H = H - H_o$) of the selected height from the mailing format height is represented at least approximately in the form of a branch fraction $$\Delta H/H = q/r.$$

12. A method according to claim 11, wherein for each image scan element which is not omitted, one image point of q successive image points and one image point of (r−q) successive image points is omitted.

13. A method according to claim 12, wherein periodically the first image point of q successive image points and the first image point of (r−q) successive image points within each non-omitted image scane elements is omitted.

14. A method according to claim 11, wherein the relative deviation of the selected height from the mailing format height is representable able at least approximately in the form of a parent fraction $\Delta H/H = 1/r$, the method including periodically omitting each $r^{th}$ image point within each image scan element which is not omitted.

15. A method according to claim 1, including finding a data density of the image points for the scan and omitting additional image points over the function in areas of low data density.

16. An apparatus for the automatic adaptation of mailing formats having different sizes, to a selected image reproduction format having a selected height and a selected length, comprising:

means for moving a mailing format in a transport direction on a transport path;

positioning a format size sensor arrangement on the transport path for sensing the mailing format;

first signal processing means connected to said sensor arrangement for determining at least one of a height and length excess over the selected height and length respectively, said first signal processing means generating signals corresponding to length and height excesses of the mailing format; and opto-electronic scanning means for scanning a mailing format and controllable by said first signal processing means for omitting at least some information about the mailing formay as a function of at least one of the length and height excesses.

17. An apparatus according to claim 16, wherein said opto-electronic scanning means comprises a scanning device containing a plurality of photo-diodes arranged to form an image scan element.

18. An apparatus according to claim 17, wherein said image scan element comprises a column of a selected number of photodiodes, said photo-diodes extending transversely to the transport direction, said opto-electronic scanning means including second signal processing means connected to said photo-diodes for picking up brightness values of individual image points taken from the mailing format.

19. An appartus according to claim 18, including decoding means connected between said first and second signal processing means for generating a signal based on the height and length excesses, which signal controls said second signal processing means to omit selected image points during a scanning of the mailing format and as a functiion of the height and length excesses.

20. An apparatus according to claim 19, including storage means connected to said second signal processing means for storing non-omitted image points from the scanning of the optoelectronic scanning means.

21. An appartus aaccording to claim 20, including display means connected to said storage means for generating a reproduction image based on the non-omitted image elements stored in said storage means.

* * * * *